(No Model.)
J. W. HORNER.
SECTIONAL COMPOUND TELEGRAPH WIRE PROTECTOR.
No. 291,478. Patented Jan. 1, 1884.
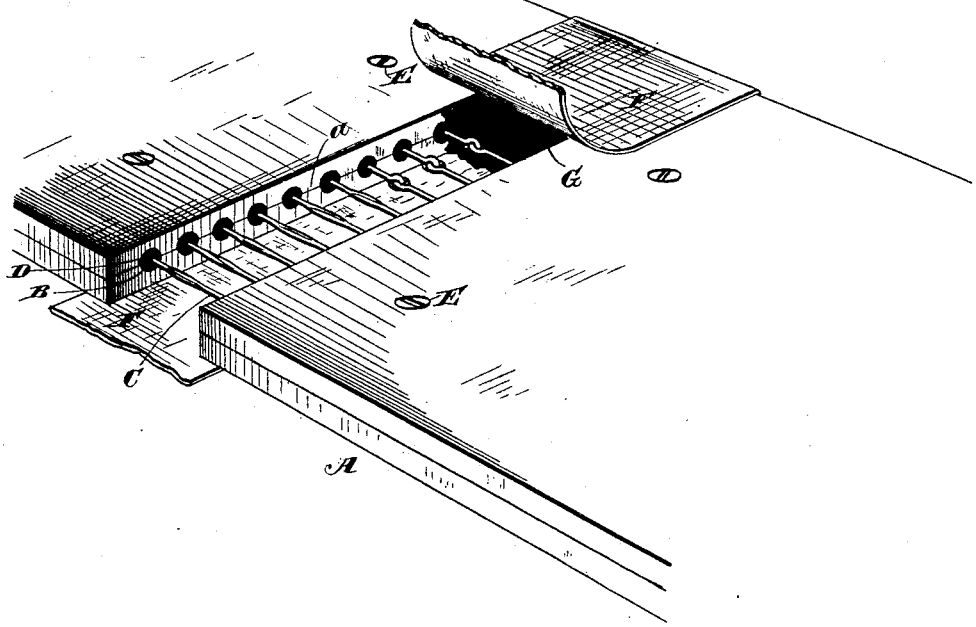
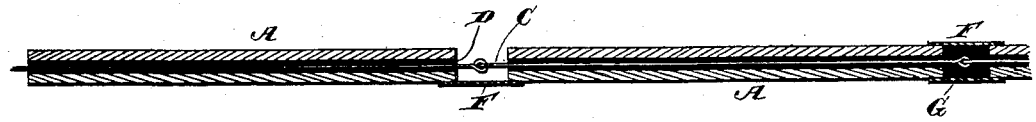
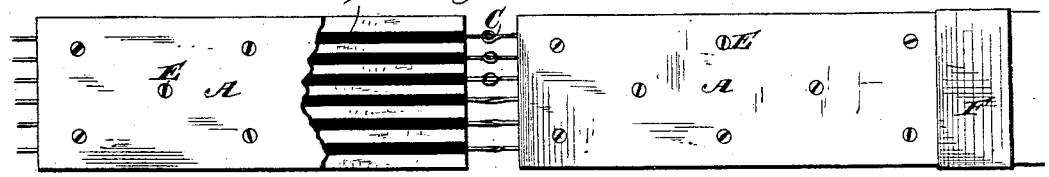
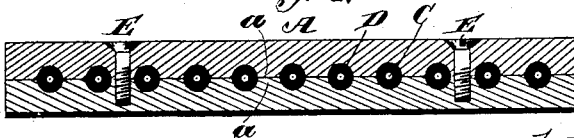
Witnesses.
Robert Everett.
George W. Rea.
Inventor:
Joseph W. Horner.
By James L. Norris
Atty.

UNITED STATES PATENT OFFICE.

JOSEPH W. HORNER, OF NEW YORK, N. Y.

SECTIONAL COMPOUND TELEGRAPH-WIRE PROTECTOR.

SPECIFICATION forming part of Letters Patent No. 291,478, dated January 1, 1884.

Application filed November 2, 1883. (No model.)

*To all whom it may concern:*

Be it known that I, JOSEPH W. HORNER, a citizen of the United States, residing at New York, in the county and State of New York, have invented new and useful Improvements in Sectional Compound Telegraph-Wire Protectors, of which the following is a specification.

My invention has for its object to form a conductor for telegraphic and other purposes, made in sections which can be readily set and have the wires of one section connected to those of an adjacent section, and the joint between the sections sealed after the sections have been united; and it consists in forming each section of a plate divided longitudinally, and having formed in its meeting faces registering recesses which contain the wires isolated from each other by portions of the plate, and insulated from the plate and held in place by an insulating material enveloping the same; and it further consists in the construction and combination of parts, and the method of uniting them, as hereinafter particularly described, and then pointed out in the claims.

Figure 1 of the drawings is a perspective view of a portion of two sections of the conductor, showing the manner of connecting the wires and forming the joint. Fig. 2 is a longitudinal section through a series of the sections, showing at one point the connection between the sections before the joint is completed, and at another point the connection when the joint is completed. Fig. 3 is a side view of Fig. 2 with a portion of one of the sections of the plate broken away. Fig. 4 is a transverse section through one of the sections of the conductor.

Each section of the conductor is composed of a longitudinally-divided plate or boxing, A, made, preferably, of cast-iron, but which may be made of any other suitable metal, wood, clay, or vitreous or other material. The meeting faces of the boxes are each formed with a series of recesses, B, registering with each other, and preferably of semicircular form, although they may be of any desired angular shape. Each one of these recesses contains a wire, C, which is embedded or enveloped in an insulating composition, D, of any of the well-known kinds now in use, but preferably of asphaltum. This insulating material completely insulates the wire from the boxing material, and each wire of the series in the box is isolated from the others by the walls $a$ of the box intervening between the recesses of the series, as shown in Figs. 1 and 4. The two divisions of the box are held together by screws E, or other suitable clamping or fastening devices. By constructing each box-section of the conductor as described the section can be made up complete at any point and closely packed, to be transported to any distance ready for laying without danger of the wires becoming separated from their boxing, and without danger of their being brought into contact with each other. When the box-sections are to be combined, the wires of one section are united to those of the following section by brazing them together, as shown in one portion of Figs. 1 and 4, or by hooking them together, as shown in another portion of the same figures, or in any other suitable manner, leaving a space of, say, two inches between the sections. A strip, F, of sheet metal, canvas, or other suitable material, is then passed under the box-sections beneath the intervening space, with one end extended so that it may be turned over onto the top of the box-sections. A filling, G, of asphaltum or any of the other well-known insulating materials, is introduced into the intervening space, so as to completely envelop the wires and bear against the ends of the box-sections, after which the strip F is turned down onto the top of the sections over the filled space, and attached to the box-sections by the asphaltum or other means. A coating of coal-tar may then be applied over the joint. In laying the boxes they should be set on edge in a trench, so that they can be reached from either side.

Any desired number of the box-sections may be combined in the manner described, and when so brought together they form a sectional compound telegraphic conductor, simple in construction and application, and in which the wires can be easily reached at the joints of the sections for repairs by removing the strip and the filling.

In securing the wires within the boxes, they are laid in the recesses therein, after which the two parts of the box are fastened together. The box is now placed and supported in an upright position upon one end in a clamp which will seat said end and retain the wires centrally within their respective recesses in the box. The wires will next be drawn straight and tight by a similar or other suitable clamping device at the other end of the box, the wires being free from any contact whatever, except with the insulating material. The asphaltum or any of the other well-known insulating materials is then poured or forced into the recesses in a fluid state, and passing down through the recesses completely envelopes the wires, thereby perfectly insulating them from the box. By supporting the boxes in a vertical position, and then passing the insulating material down through the recesses, the wires not only become perfectly enveloped therein, but will not drop nor be so apt to be forced out of a straight line as when the box is set horizontally and the insulating material introduced while in that position.

I am aware that it is not new to form a two-part box with a wire passed loosely through recesses in the same; nor to form a board or plank with grooves, in which are laid wires with an insulating material on top of the wires; nor to make a sectional conductor by enveloping a series of wires in an insulating material to form the casing or envelope therefor.

Having thus described my invention, what I claim is—

1. The two-part box having registering recesses formed in its meeting faces, in combination with the wires passing through said recesses, and an insulating material enveloping said wires and securing them within said recesses, substantially as described.

2. The within-described sectional compound conductor, composed of a series of two-part boxes set upon edge, and having registering recesses formed in their meeting faces, with wires passing through said recesses and held therein, and insulated from the boxes by an insulating material filling the recesses and enveloping the wires, the wires of one box being united with those of an adjoining box, and the joint between the boxes being made by a filling of insulating material covering the wires, and by a covering-strip, substantially as described.

In testimony whereof I hereunto set my hand in the presence of two subscribing witnesses.

JOSEPH W. HORNER.

Witnesses:
   JAMES L. NORRIS,
   JOS. L. COOMBS.